(12) United States Patent  
Bae

(10) Patent No.: US 9,451,105 B2  
(45) Date of Patent: Sep. 20, 2016

(54) IMAGE FORMING APPARATUS AND IMAGE FORMING METHOD THEREOF

(71) Applicant: Samsung Electronics Co., Ltd., Suwon-si, Gyeonggi-do (KR)

(72) Inventor: Sung-hwan Bae, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/689,552

(22) Filed: Apr. 17, 2015

(65) Prior Publication Data

US 2015/0301771 A1  Oct. 22, 2015

(30) Foreign Application Priority Data

Apr. 17, 2014 (KR) .................. 10-2014-0045885

(51) Int. Cl.
*H04N 1/00* (2006.01)
*H04N 1/387* (2006.01)
*G06F 17/24* (2006.01)
*G06K 9/00* (2006.01)

(52) U.S. Cl.
CPC ........ *H04N 1/00482* (2013.01); *G06F 17/243* (2013.01); *G06K 9/00449* (2013.01); *H04N 1/0044* (2013.01); *H04N 1/387* (2013.01)

(58) Field of Classification Search
USPC ................ 358/1.9, 1.13, 1.11, 406, 434, 1.6
See application file for complete search history.

(56) References Cited

U.S. PATENT DOCUMENTS

| | | | | |
|---|---|---|---|---|
| 5,721,940 A | * | 2/1998 | Luther | G06F 17/243 715/200 |
| 2005/0057779 A1 | * | 3/2005 | Sesek | G06K 9/2063 358/400 |
| 2009/0128863 A1 | * | 5/2009 | Enomoto | G06F 21/608 358/434 |
| 2010/0220343 A1 | * | 9/2010 | Horikawa | G06T 11/60 358/1.11 |
| 2013/0201532 A1 | * | 8/2013 | Takemoto | H04N 1/00015 358/406 |
| 2014/0063516 A1 | * | 3/2014 | Shiohara | G06F 3/1205 358/1.9 |
| 2014/0320880 A1 | * | 10/2014 | Kotsuji | H04N 1/00838 358/1.13 |
| 2015/0070729 A1 | * | 3/2015 | Osada | H04N 1/38 358/1.18 |
| 2015/0363377 A1 | * | 12/2015 | Dojo | G06Q 10/063 715/224 |

FOREIGN PATENT DOCUMENTS

WO   WO2014153156   *   3/2013   ............. G06F 17/21

* cited by examiner

*Primary Examiner* — Jerome Grant, II
(74) *Attorney, Agent, or Firm* — Staas & Halsey LLP

(57) ABSTRACT

An image forming apparatus and image forming method are provided. An image forming apparatus includes an inputter configured to receive a form image, a detector configured to detect at least one area where a content is inputtable from the form image, a user interface configured to receive a command to input a content into the detected area, a controller configured to make the detected area correspond to the inputted content and an outputter configured to print a content inputted into the detected area on an area corresponding to the inputted content.

17 Claims, 14 Drawing Sheets

FIG. 3

[FIRST ANNEXED FORM]

| INVENTION DISCLOSURE | PROCESS PERIOD |
|---|---|

| INVENTOR | ①NAME | KOREAN : <br> CHINESE : | ②RESIDENT REGISTRATION NUMBER | |
|---|---|---|---|---|
| | ③ADDRESS | | | |
| | ④AFFILIATION | CURRENT: | (AT TIME OF INVENTION: | ) |
| | ⑤POSITION | CURRENT: | (AT TIME OF INVENTION: | ) |

| ⑥KIND OF INVENTION | PATENT(UTILITY MODEL,DESIGN) |
|---|---|
| ⑦TITLE OF INVENTION | |

The present invention related with the work is declared under the prescription of Article 5, Article 8(2) of a regulation regarding a disposition, a management and a reward of a public official's invention and the prescription of Article 2(1) of the enforcement regulations.

YEAR    MONTH    DAY

DECLARANT:    (SIGN)

PRESIDENT OF THE INVENTION ORGANIZATION

※ ENCLOSURES     COMMISSION CHARGE

1. DESCRIPTION OF CHARACTER OF INVENTION (1)
2. ABSTRACT OF INVENTION (1)

502585-05611MIN     210mm x 297mm
AMENDMENT APPROVAL     (PLAIN PAPER 60g/m² (RECYCLABLE))

[FIRST ANNEXED FORM]

INVENTION DISCLOSURE | PROCESS PERIOD

| | | | |
|---|---|---|---|
| INVENTOR | ①NAME | KOREAN : <br> CHINESE : | ②RESIDENT REGISTRATION NUMBER |
| | ③ADDRESS | | |
| | ④AFFILIATION | CURRENT | (AT TIME OF INVENTION: ) |
| | ⑤POSITION | CURRENT | (AT TIME OF INVENTION: ) |

⑥KIND OF INVENTION    PATENT(UTILITY MODEL, DESIGN)

⑦TITLE OF INVENTION

The present invention related with the work is declared under the prescription of Article 5, Article 8(2) of a regulation regarding a disposition, a management and a reward of a public official's invention and the prescription of Article 2(1) of the enforcement regulations.

YEAR    MONTH    DAY

DECLARANT:        (SIGN)

PRESIDENT OF THE INVENTION ORGANIZATION

COMMISSION CHARGE

※ ENCLOSURES
1. DESCRIPTION OF CHARACTER OF INVENTION (1)
2. ABSTRACT OF INVENTION (1)

502585-05611MIN                                210mm x 297mm
AMENDMENT APPROVAL            (PLAIN PAPER 60g/m² (RECYCLABLE))

FIG. 9

[FIRST ANNEXED FORM]

INVENTION DISCLOSURE

PROCESS PERIOD

| INVENTOR | ①NAME | KOREAN : <br> CHINESE : | ②RESIDENT REGISTRATION NUMBER | |
| | ③ADDRESS | | | |
| | ④AFFILIATION | CURRENT: | (AT TIME OF INVENTION: ) | |
| | ⑤POSITION | CURRENT: | (AT TIME OF INVENTION: ) | |

⑥KIND OF INVENTION | PATENT(UTILITY MODEL, DESIGN)

⑦TITLE OF INVENTION

☐ The present invention related with the work is declared under the prescription of Article 5, Article 8(2) of a regulation regarding a disposition, a management and a reward of a public official's invention and the prescription of Article 2(1) of the enforcement regulations.

YEAR   MONTH   DAY

DECLARANT:      (SIGN)

PRESIDENT OF THE INVENTION ORGANIZATION

※ ENCLOSURES                                    COMMISSION CHARGE

1. DESCRIPTION OF CHARACTER OF INVENTION (1)
2. ABSTRACT OF INVENTION (1)

502585-05611MIN                                 210mm x 297mm
'99. 6. 2. AMENDMENT APPROVAL    (PLAIN PAPER 60g/㎡ (RECYCLABLE))

FIG. 10

[FIRST ANNEXED FORM]

| | | INVENTION DISCLOSURE | | PROCESS PERIOD | ~903 |

| INVENTOR | ①NAME | KOREAN : <br> CHINESE : | ②RESIDENT REGISTRATION NUMBER | |
|---|---|---|---|---|
| | ③ADDRESS | | | |
| | ④AFFILIATION | CURRENT: | (AT TIME OF INVENTION: ) | |
| | ⑤POSITION | CURRENT: | (AT TIME OF INVENTION: ) | |

| ⑥KIND OF INVENTION | PATENT(UTILITY MODEL,DESIGN) |
|---|---|
| ⑦TITLE OF INVENTION | |

The present invention related with the work is declared under the prescription of Article 5, Article 8(2) of a regulation regarding a disposition, a management and a reward of a public official's invention and the prescription of Article 2(1) of the enforcement regulations.

YEAR [ ] MONTH [ ] DAY

DECLARANT: [ ] (SIGN)

PRESIDENT OF THE INVENTION ORGANIZATION

COMMISSION CHARGE

※ ENCLOSURES
1. DESCRIPTION OF CHARACTER OF INVENTION (1)
2. ABSTRACT OF INVENTION (1)

502585-05611MIN　　　　　　　　　　　　　210mm x 297mm
AMENDMENT APPROVAL　　　　　(PLAIN PAPER 60g/m² (RECYCLABLE))

[FIRST ANNEXED FORM]

| INVENTION DISCLOSURE | PROCESS PERIOD |
| --- | --- |
| | XXXX-XX-XX ~1101 |

| INVENTOR | ①NAME | KOREAN :KINDONG, HONG<br>CHINESE : 洪吉童 | ②RESIDENT REGISTRATION NUMBER | |
| --- | --- | --- | --- | --- |
| | ③ADDRESS | ○○○ ○○○ ○○○○<br>○○○ ○○○ ○○○○ ○○○○ | | |
| | ④AFFILIATION | CURRENT: XXX | (AT TIME OF INVENTION: ) | |
| | ⑤POSITION | CURRENT: XXX | (AT TIME OF INVENTION: ) | |

| ⑥KIND OF INVENTION | PATENT(UTILITY MODEL,DESIGN) |
| --- | --- |
| ⑦TITLE OF INVENTION | IMAGE FORMING APPARATUS, IMAGE FORMING METHOD, AND RECORDABLE MEDIUM PERFORMING METHOD THEREOF |

The present invention related with the work is declared under the prescription of Article 5, Article 8(2) of a regulation regarding a disposition, a management and a reward of a public official's invention and the prescription of Article 2(1) of the enforcement regulations.

XXXX YEAR  XX MONTH  XX DAY

DECLARANT: PANSEO, HONG        (SIGN)

PRESIDENT OF THE INVENTION ORGANIZATION

| ※ ENCLOSURES | COMMISSION CHARGE |
| --- | --- |
| 1. DESCRIPTION OF CHARACTER OF INVENTION (1)<br>2. ABSTRACT OF INVENTION (1) | XXX.XX WON |

502585-05611MIN                                    210mm x 297mm
AMENDMENT APPROVAL            (PLAIN PAPER 60g/m² (RECYCLABLE))

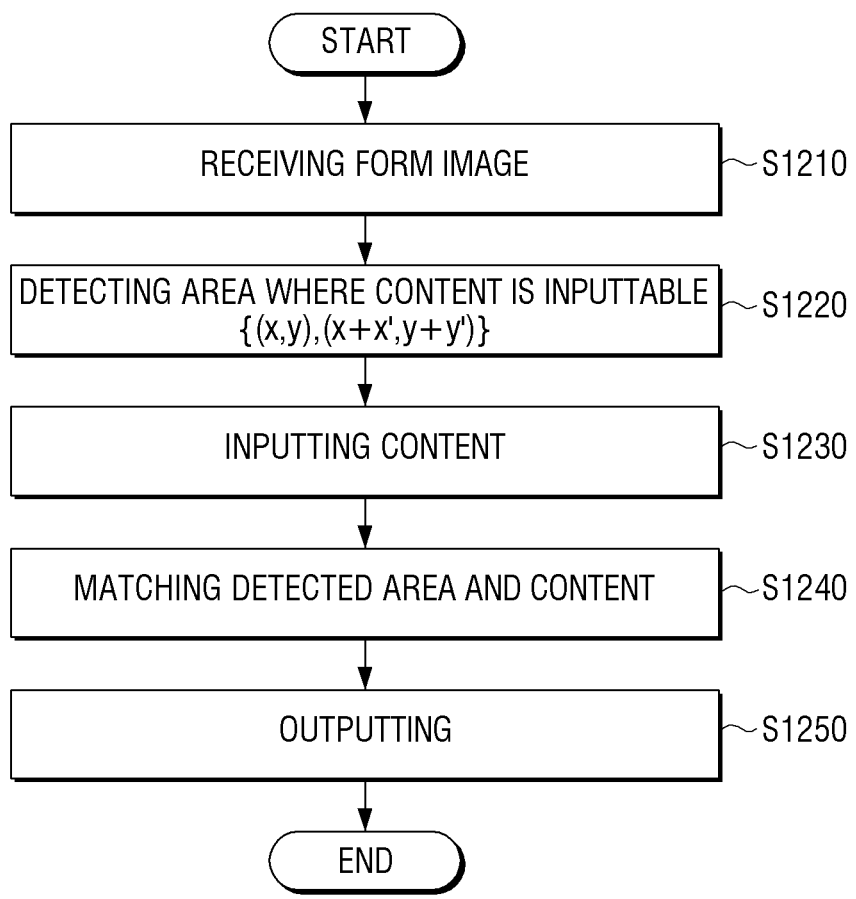

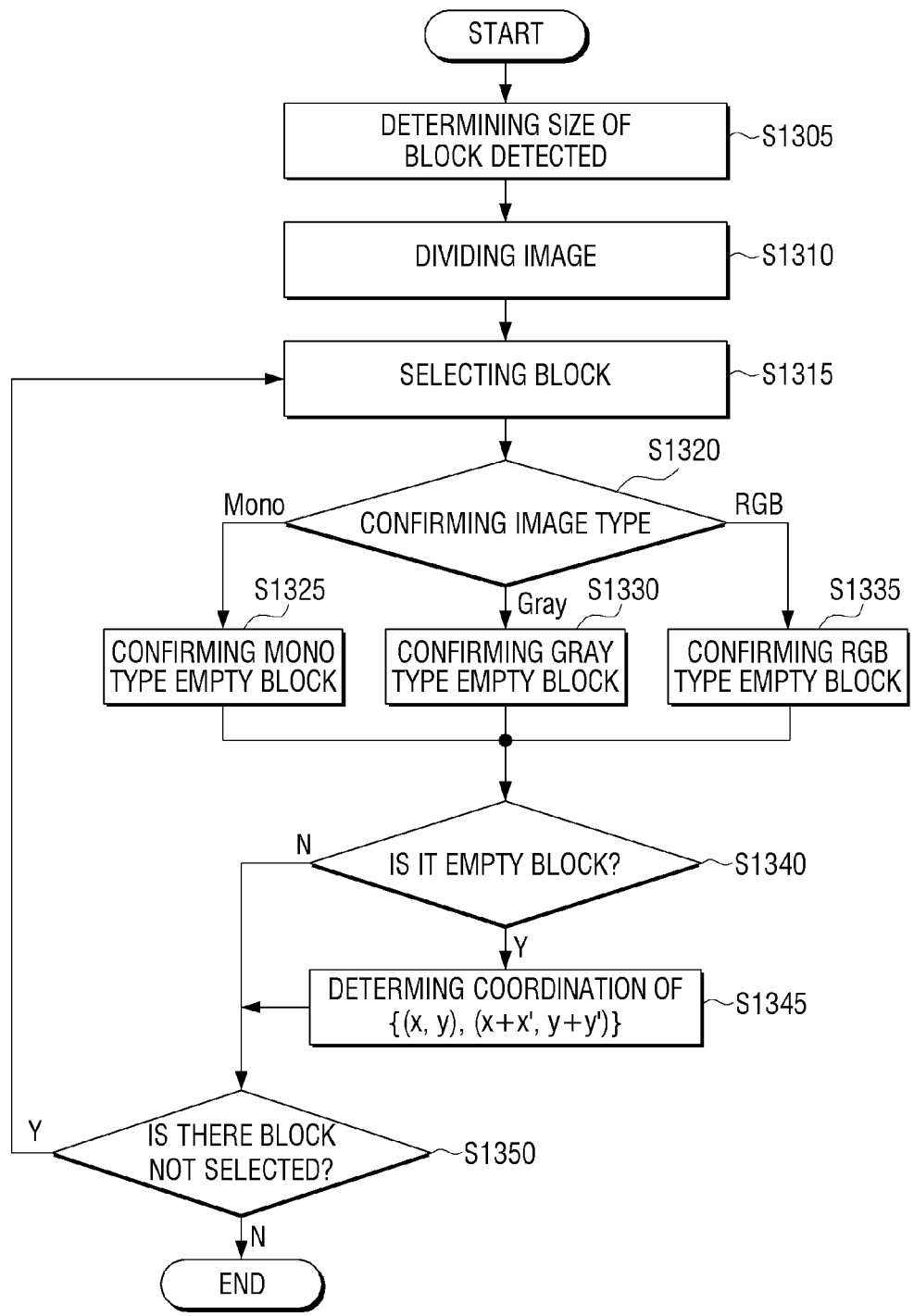

IMAGE FORMING APPARATUS AND IMAGE FORMING METHOD THEREOF

CROSS-REFERENCE TO RELATED APPLICATIONS

This application is related to, and claims priority benefit from Korean Patent Application No. 10-2014-0045885, filed on Apr. 17, 2014, in the Korean Intellectual Property Office, the disclosure of which is incorporated herein by reference in its entirety.

BACKGROUND

1. Field

Methods and apparatuses of exemplary embodiments relate to an image forming apparatus and an image forming method, and more particularly, automatically detecting a space where a content is inputtable from an image file of a document including a form.

2. Description of the Related Art

An image forming apparatus is an apparatus that prints print data generated from a terminal device such as a computer on a recording sheet. A photocopier, a printer, a facsimile or a multi function peripheral (MFP) realizing a function of the photocopier, the printer and the facsimile with a single apparatus and the like are examples of an image forming apparatus.

In general, institutions, banks and various offices handling a document, may output a form document with a fixed form and a blank space for handwritten information. With the development of a computer technology, without filling in a relevant content in a document where a form document is printed, a document can be shown to a client or other party who wishes to fill out the form using an electronic document where the form is filled in, and a text input box in a form of a bar is provided at a corresponding blank. A form document in a form of an electronic document can be provided to a user online through a network, and a user only inputting a corresponding content into a text box, so that a management of clients' information and various office works can be done more conveniently.

However, a related form document in a form of an electronic document may require a form solution server that provides a function described above, and an operation of designating an edition and a composition of the form document and an item matching with a field where a content to be inputted may be required by accessing a server and using a form solution program installed in a server by a separate server administrator. In other words, the related arts have difficulty in that even if an office requires a small amount of information, the office may be required to buy an expensive server and a solution program to use an electronic form document, and go through a difficult operation to generate and edit a form document using a form solution program.

Accordingly, a method of generating an electronic form document easily using the user's printed form document is desired.

SUMMARY

Additional aspects and/or advantages will be set forth in part in the description that follows and, in part, will be apparent from the description, or may be learned by practice of the invention.

According to an aspect of the present invention, an image forming apparatus is provided capable of automatically detecting a space where a content is inputtable from an image file of a document with a form and printing an image where a content is inputted and an image forming method thereof.

An image forming apparatus includes an inputter configured to receive a form image, a detector configured to detect at least one area where a content is inputtable from the form image, a user interface configured to receive a command to input a content into the detected area, a controller configured to make the detected area correspond to the inputted content and an outputter configured to print a content inputted into the detected area on an area corresponding to the inputted content.

The outputter combines and prints a content corresponding to the detected area on the form image.

The image forming apparatus includes a scanner configured to scan a manuscript and generate a scan image, wherein the inputter receives a scan image generated from the scanner.

The detector outputs information regarding a location and a size of an area where the detected content is inputtable using two 2-dimensional coordinates.

The detector divides the received image into a unit of a predetermined-size block and detects at least one area where a content is inputtable.

The predetermined-size block is in a half-width and in a half-height of a smallest content among contents that are inputtable at the user interface.

In response to the received image being a mono type, the detector excludes the whole block including any pixel having a value of 1 from an area where a content is inputtable, and in response to the image being a gray type or an RGB type, the detector excludes the whole block including any pixel of which value is not less than a pre-analyzed threshold value from an area where a content is inputtable if any pixel value of any one of pixels in the block is not less than a pre-analyzed threshold value.

The user interface displays an area where the detected content is inputtable on the form image and receives a command to select at least one area for inputting a content among the displayed area.

The controller controls a detector to detect a widest single area having a side vertical or horizontal to an arrangement of a pixel in an empty space of the received form image as an area where a content is inputtable.

An image forming method for overwriting a form image includes receiving a form image, detecting at least one area where a content is inputtable from the received image, inputting a content into the detected area, making the detected area correspond to the inputted content, and printing a content inputted into the detected area on an area corresponding to the inputted content.

The outputting includes combining and printing the received image with a corresponding content on a location of an input space where the content is inputted.

The receiving includes scanning a form manuscript and receiving a generated form image.

The detecting includes expressing information regarding a location and a size of the detected input space using two 2-dimensional coordinates.

The detecting comprises dividing the received image into a unit of a predetermined-size block and detecting at least one area where a content is inputtable.

The predetermined-size block is in a half-width and in a half-height of a smallest content among contents that are inputtable at the user interface.

The detecting includes in response to the received image being a mono type, determining that the whole block including any pixel of which value is 1, is not a space where a content is inputted if a pixel value of any one of pixels in the block is 1, and in response to the image being a gray type or an RGB type, determining that the whole block including any pixel of which value is not less than a pre-analyzed threshold value is not a space where a content is inputted if a pixel value of any one of pixels in the block is not less than a pre-analyzed threshold value.

The image forming method includes displaying an area where the detected content is inputtable on the form image and selecting at least one area for inputting a content among the displayed area.

The detecting comprises detecting a widest single area having a side vertical or horizontal to an arrangement of a pixel in an empty space of the received image as an area where a content is inputtable.

BRIEF DESCRIPTION OF THE DRAWINGS

The above and/or other features and utilities of the present general inventive concept will be more apparent by describing certain exemplary embodiments with reference to the accompanying drawings, in which:

FIG. 3 is a view illustrating an example of a form image;

FIG. 7 is a view illustrating an example of dividing a form image by a block in a predetermined size;

FIG. 9 is a view illustrating a form image provided from a user interface and a detected input space;

FIG. 10 is a view illustrating a selected input space among input spaces;

FIG. 11 is a view illustrating a form image combined with a content inputted into an input space;

FIG. 12 illustrates an image forming method according to an exemplary embodiment; and FIG. 13 illustrates a method of determining a coordinate by detecting an empty space according to an exemplary embodiment.

DETAILED DESCRIPTION

Figure 1:
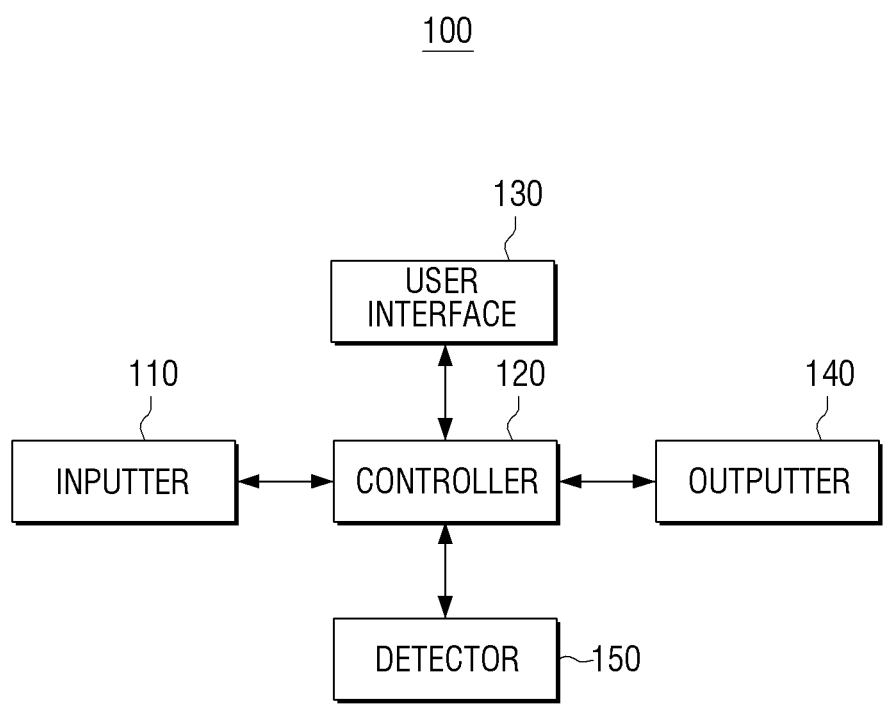
FIG. 1 illustrates an image forming apparatus according to an exemplary embodiment.

Hereinafter, exemplary embodiments are described in greater detail with reference to the accompanying drawings. In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 illustrates an image forming apparatus according to an exemplary embodiment.

Referring to FIG. 1, an image forming apparatus 100 according to an exemplary embodiment includes an inputter 110, a controller 120, a user interface 130, an outputter 140 and a detector 150.

The image forming apparatus 100 may be a printer, a scanner, a photocopier, a facsimile, an MFP including at least two functions among functions of the printer, the scanner, the photocopier and the facsimile, and the like.

The inputter 110 receives a form image. The inputter 110 receives a form image and transmits the form image to the controller 120. A form image is explained in detail below referring to FIG. 3.

The inputter 110 may include a communication interface 160, a scanner 190, and a storage 170. A function of configurations included in the inputter 110 are explained below referring to FIG. 2.

The controller 120 controls each configuration in the image forming apparatus 110. The controller 120 may make a detected area correspond to an inputted content. The controller 120 may control the detector 150 to detect at least one area where a content is inputtable from a form image transmitted from an inputter 110. The controller 120 may make the inputted content to point the detected area, and combine the inputted content and the detected area.

The controller 120 may control the detector 150 to detect a widest single area with a side vertical or horizontal to an arrangement of a pixel in an empty space of a received form image. The controller 120 may find an area where a content with a widest rectangular width is inputtable in an empty space even if a form image is not scanned correctly. (See, for example, FIG. 8.)

The controller 120 may convert an image that the inputter 110 receives to an image in a form of a raster. If an image that the controller 120 is transmitted is in a form of a vector or a processed compression image, an image in a form of the vector may be converted to an image in a form of the raster or the compression may be released. A form image converted by the controller 120 may be transmitted to the detector 150.

The user interface 130 may include various function keys so that a user is able to set or select various functions supported by the image forming apparatus 100, and the user interface 130 displays various kinds of information provided from the image forming apparatus 100. The user information 130 may be realized as an apparatus that performs inputting and outputting simultaneously such as a touch screen and the like, and be combined with an input apparatus such as a mouse, a keyboard and the like, and a display apparatus such as a CRT monitor, an LCD monitor, an LED and the like.

The user interface 130 may receive a command to input a content into a detected area. A user may input a content to an area detected as an area where a content is inputtable from a form image.

The user interface 130 may display an area where a detected content is inputtable on a form image. If the detector 150 detects an area where a content is inputtable from a form image, the user interface 130 may display an area where a content detected from a form image is inputtable on a form image to visually provide the area where a content is inputtable.

The content represents every substance that is recordable on a form image such as a letter, a number, a sign, a figure, an icon, a table, a picture and the like.

The user interface 130 may receive a command to select at least one area for inputting a content among a displayed area. Among detected areas where a content is inputtable displayed on the user interface 130, the user may select an area where the user wants and exclude the remaining area using the user interface 130.

The user interface 130 may receive a command to select an option between an option that instructs the outputter 140 to print a content inputted into a detected area on an area corresponding to the content and an option that instructs the outputter 140 to combine and print a received form image with a content inputted into a detected area.

The user interface 130 may receive a command of the detector 150 to designate a range to be detected in a form image as an area where a content is inputtable.

The outputter 140 may print a content inputted into a detected area on an area corresponding to the inputted content. The outputter 140 may print an inputted content on a corresponding location based on information that makes an area detected by the detector 150 correspond to a content inputted by the interface 130. The outputter 140 may combine and print a content corresponding to a detected area on a form image. The detector 150 may transmit and print a data where a content is overlapped and rendered on a corresponding location of a form image based on information that makes location information of a detected area correspond to an inputted content. Accordingly, the outputter 140 may insert a form document corresponding to a form image of the image forming apparatus 100 into a feeder and print only a content inputted into a location of an input space on the form document, or may combine a content inputted into a location of an input space with a form image and print on a blank paper.

The detector 150 detects at least one area where a content is inputtable from a form image. If a form image in a shape of low data is received, the detector 150 may detect, e.g., immediately detect an area where a content is inputtable. The detector 150 may analyze the form image and detect an area where a content written already locates and an empty area from a form image with a letter, a number, a sign, a border, a boundary line and the like. For example, if there is a blank to enter a content corresponding to an item of a form document in a form image, the detector 150 may detect an area where the content is inputtable.

The detector 150 outputs information of a location and a size of an area where a detected content is inputtable using two 2-dimensional coordinates. The detector 150 may describe information of a location and a size of a detected area using two 2-dimensional coordinates {(x, y), (x+x', y+y')} and may output through a controller 120. Accordingly, if an empty box to input in a form image is detected and a content is inputted into the detected area, the controller 120 may connect two 2-dimensional coordinates of information of the inputted content and the detected area. The controller 120 may make the information where an inputted content and two coordinates are connected correspond to a corresponding form image and may store the information in a storage 170.

The detector 150 detects a valid empty space not smaller than a minimum size where a content is inputtable among an empty space of a form image.

The minimum size where a content is inputtable may be defined as, for example, if a minimum size of a text that is inputtable into a form image is 10 point, and a text smaller than 10 point is not set to be inputted, a size where a letter of a text set to 10 point is a minimum size. Accordingly, a content is not inputtable into an empty space smaller than a minimum size, upon the empty space being smaller than a minimum size, it may be determined that a content is not inputtable.

The detector 150 may divide a received image into a unit of a predetermined size so that at least one area where a content is inputtable may be detected. The predetermined-size block may be a block in a half-weight and a half-height of the smallest content among a content inputtable at the user interface 130, as illustrated, for example, in FIGS. 5-7.

If a received image is a mono type and any one of pixel values of pixels in a block is 1, the detector 150 may exclude a whole block where any one of pixel values is 1, and if an image is a gray type or an RGB type, and any one of pixel values of pixels in a block is not less than a pre-analyzed threshold value, a whole block where any one of pixel values of pixels in a block is not less than a pre-analyzed threshold value may be excluded from an area where a content is inputtable.

The image forming apparatus according to an exemplary embodiment may not require an additional form document solution program, a software or a server apparatus, and provides a function of automatically detecting an area where a content is inputtable from a form image using only the form image, and inputting and printing in type, so that it is possible to fill in and print a form document easily.

An exemplary image forming apparatus 100 is illustrated, but the image forming apparatus may include additional configurations other than described configuration. An exemplary image forming apparatus 100 is explained below referring to FIG. 2.

Figure 2:
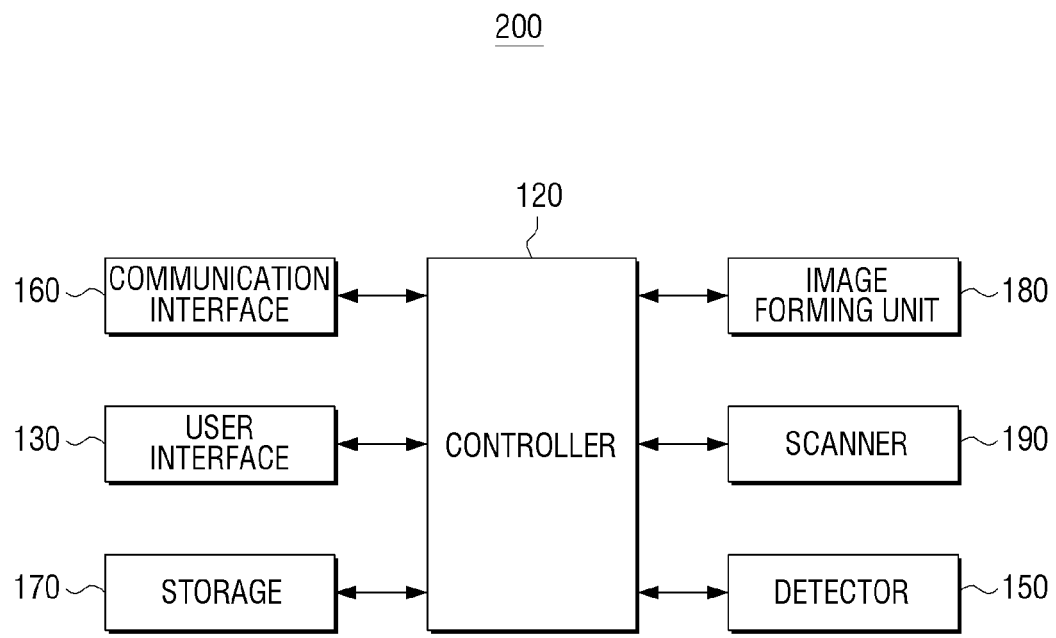
FIG. 2 illustrates an image forming apparatus according to an exemplary embodiment.

FIG. 2 illustrates an image forming apparatus according to an exemplary embodiment.

Referring to FIG. 2, the image forming apparatus 200 may include the communication interface 160, the user interface 130, the storage 170, the controller 120, an image forming data 180, the scanner 190 and the detector 150.

An operation of the controller 120, the user interface 130 and the detector 150 may be similar to each of the elements explained referring to FIG. 1, and thus, redundant explanations are omitted.

The inputter 110 of the image forming apparatus 100 in FIG. 1 according to an exemplary embodiment may be connected with the scanner 190, the communication interface 160 and the storage 170.

The scanner 190 may scan a manuscript and generate a scan image. A manuscript in the image forming apparatus 100 such as a form document may be scanned and a form image may be generated. A shape of data of a scan image scanned and generated by the scanner 190 is raw data.

The communication interface 160 performs a communication with an external apparatus. The communication interface 160 may connect the image forming apparatus 100 with an external apparatus, and include a paralleled port, a universal serial bus (USB) port, a wireless port and the like. A form image may be received from an external apparatus or an external storage medium connected with the image forming apparatus 100 through the communication interface 160.

The storage 170 stores a file. A form image of a form document that was scanned previously and a form image stored in an external apparatus through the communication interface 160 may be copied, or a form image transmitted by communicating with an external apparatus may be stored. The storage 170 may be realized as a magnetic recording media such as a hard disk drive (HDD), a flash memory such as a solid state drive (SSD) and the like.

The outputter 140 of the image forming apparatus 100 in FIG. 1 according to an exemplary embodiment may be connected with the image forming data 180, the communication interface 160, and the storage 170.

The image forming unit 180 may print print data on a paper. Printing data of an image where a content is inputted from the controller 120 or printing data where a form image and an inputted content is combined may be printed on a paper. A general printing technique such as a dot matrix, an inkjet, a laser, a plotter and the like may be used to print on a paper by the image forming data 180.

The communicator interface 160 performs a communication with an external apparatus. The image forming apparatus may be connected with an external apparatus, and include, for example, a parallel port, a universal serial bus (USB) port, a wireless port and the like.

The outputter 140 may transmit information generated by combining a form image, a form image combined with an inputted content or a coordinate {(x, y), (x+x', y+y')} indicating a location and a size of an input space with a content inputted into an input space through the communication interface 160 to an external apparatus or an external storage medium in a shape of data.

The storage 170 stores data. The storage 170 may store a new form image inputted by the inputter 110 or store a form image combined through a controller 120. The storage 170 may store a content that is inputted and a coordinate corresponding to the inputted content.

A database corresponding to a form image may be established in the storage 170 so that a plurality of users may arrange and store a content inputted into an input space corresponding to an input box of each item in a table shape. A content in a form image written previously that is stored in the storage 170 may be amended or reused. A combined form image file where an input space is left blank may be distributed to other people so that the people fill in the blank.

An image forming apparatus according to an exemplary embodiment autonomously generates a form image and automatically detects an area where a content is inputtable. An image forming apparatus may include various ways such as inputting, storing and distributing a content into a form image where an input space is detected, so that an effectiveness of the image forming apparatus and a convenience of a user is improved.

FIG. 3 is a view illustrating an exemplary form image.

Referring to FIG. 3, a kind of a document that is [the first annexed form] is indicated, for example, in the upper left side of a form image 300, and boxes indicating a process period, personal data of an inventor, a kind of an invention, a title of an invention, a date, a declarant, and a commission charge are illustrated.

A form may be defined as a method of representing a document with a form to write a content corresponding to a specific item such as a name, a resident registration number, an address and the like in a table, for example, in a right side or below. A form image may be defined as a document with an arranged form. In other words, in a form image, objects such as a letter, a paragraph, a table, a picture and the like included in an electronic document are not distinguished like an electronic document file of a general word processor, but the form image is a picture file. A format of the form image may be JIF, JPG, PSD, PNG, TIF and TGA, but is not limited thereto. FIG. 3 illustrates an exemplary form image 300 that is an "INVENTION DISCLOSURE" that is a form document of the Korean Intellectual Property Office is explained as an example.

Figure 4:
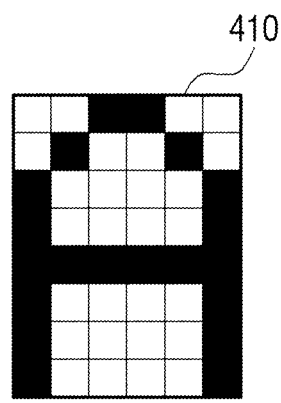
FIG. 4 is a view illustrating an example of a pixel area with a font.

FIG. 4 is a view illustrating an example of a pixel area including a font.

FIG. 4 illustrates an expanded area 410 of 6 pixels in weight and 8 pixels in height with the letter "A". The image forming apparatus 100 according to an exemplary embodiment may determine a predetermined size of a block to detect an empty space from a form image.

A predetermined-size block may be a block in a half-weight and a half-height of the smallest content among inputtable contents at the user interface 130.

The reason why a block in a half-weight and a half-height of the smallest content among inputtable contents becomes a predetermined size of a block that is a unit to divide a form image is explained below referring to FIGS. 5 and 6.

Figure 5:
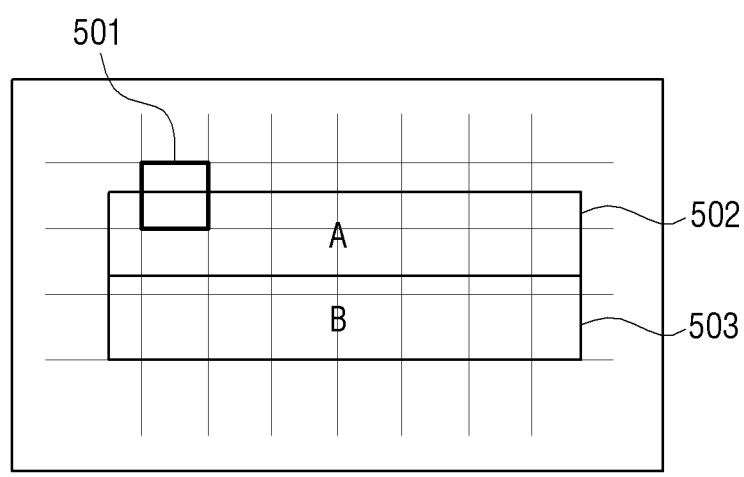
FIGS. 5 and 6 are views illustrating an example of dividing a form image with a different size of a block unit.
Figure 6:
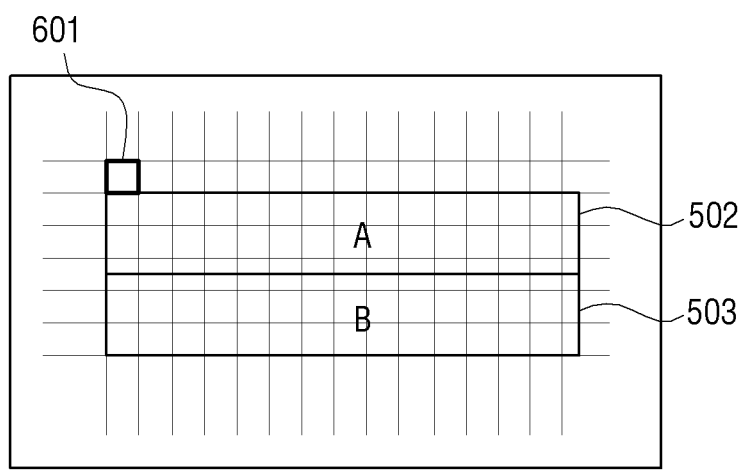

FIGS. 5 and 6 are views illustrating an example of a form image divided in different size of a block unit.

FIG. 5 is a view illustrating a case where a form image is divided by a block with a side that is longer than a half of a side of the smallest content. In FIG. 5, an expanded input box in the form image divided in a block is illustrated. In this case, as illustrated in FIG. 5, an input box A 502 and an input box B 503 where the smallest content is inputtable exist, but all boundary lines cross inside of a block, and thus, they are not determined as an area where a content is inputtable.

On the other hand, referring to FIG. 6, if each of a width and height of a block 601 is a half-width and a half-height of the smallest size of content, and a form image is divided by a unit of a block of this size, even if an area where a block of the smallest size is inputtable locates in anywhere of the form image, a block including an empty space in the input space A 502 and the input space B 503 where a content of the smallest size is inputtable exists, and thus, they are determined as an area where a content is inputtable.

FIG. 7 is a view illustrating an example of dividing a form image illustrated in FIG. 3 by a block in a predetermined size.

FIG. 7 illustrates a form image 300 divided by a block 701 that is set to 4 points in weight and 5 points in height. Using a small size of a block can improve the more precise detection of an area where a content may be inputtable, but increases the time to detect the area where a content may be inputtable. Thus, using a block in a half-width and a half-length of an area including the smallest content may save a time to detect while detecting a valid empty space on the form image 300.

Selecting a block to detect an empty space may progress, for example, from the uppermost left side to a right side, and a line may be changed at the end of the right side. A block that is selected to detect an empty space may be separated from a block that is not selected, and thus, it may not be selected again. A block that is not selected in an area already detected as an area where a content is inputtable is not selected as a block to detect an empty space, and thus, a repeated detecting unnecessarily may not be performed. Whether a block is selected may be confirmed by checking given bits of flag words in each of the blocks.

Figure 8A:
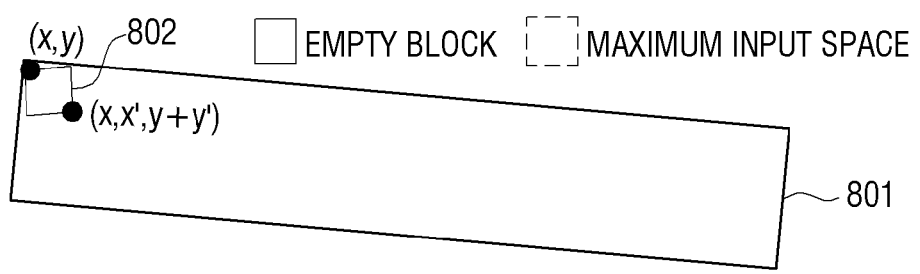
FIGS. 8A-8B illustrate an example of determining a coordinate of an area where a content is inputtable from a content of a block which is detected as a blank space.
Figure 8B:
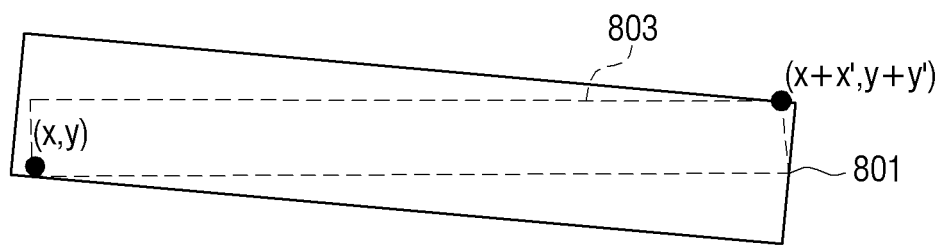

FIGS. 8A-8B illustrate an exemplary determining a coordinate of an area where a content is inputtable from a coordinate of a block detected as an empty space.

If a block selected to detect an empty space is a block including an empty space, it may be determined whether a perimeter of the block corresponds to an area where a content is inputtable. A determination whether a content is inputtable into an area may be made by checking a pixel of the perimeter of the block including an empty space and determining whether an empty space that is sufficient to input the smallest content is secured.

If a pixel value of a perimeter of a block is confirmed and it is determined that an empty space where a content of the smallest size is inputtable, an area of a corresponding empty space may be detected as an area where a content corresponding to the smallest size is inputtable.

The detected area where a content corresponding to the smallest size may indicate information regarding a location and a size of a corresponding area using two 2-dimensional coordinates. A starting point of a 2-dimensional coordinate that becomes a center of the 2-dimensional coordinate indicating a location and a size of an empty space where a content is inputtable may be one of the corners of a form image. The starting point of a 2-dimensional coordinate may be another location, for example, a center of a form image.

Two 2-dimensional coordinates indicating a location and a size of a block that is detected as an area of the smallest size where a content is inputtable may be two 2-dimensional coordinates corresponding to two edge-points in a diagonal direction of the detected block. If a block of the smallest size where a content is inputtable is detected, two 2-dimensional coordinates may be a coordinate (x, y) on an upper left corner and a coordinate (x+x', y+y') on a lower right corner, or may be a coordinate (x, y) on a lower left corner and a coordinate (x+x', y+y') on an upper right corner.

Based on two detected 2-dimensional coordinates, a widest single area with a side vertical or horizontal to an arrangement of a pixel in an empty space of a received form image may be controlled to be detected as an area where a content is inputtable.

Referring to FIGS. 8A-8B, a widest single area where a content is inputtable may be detected by comparing two areas below. If an empty block 802 is indicated using two 2-dimensional coordinates, (x, y) and (x+x', y+y'), by confirming a pixel in a right direction of a block, an area where a content is inputtable is detected up to a part overlapped with a boundary line that is not an empty space, and by confirming a pixel downwards, a first group {(x, y), (x+x', y+y')} may be calculated. By confirming a pixel downwards at a coordinate of the first empty block, an area where a content is inputtable may be detected up to a part overlapped with a boundary that is not an empty space. By confirming a pixel in a right direction of a block, the second group {(x, y), (x+x', y+y')} may be calculated. Sizes of two empty spaces calculated as (x'×y') from coordinates of the first group and the second group indicating two areas may be compared, and an area of a larger empty space may be selected as an area to be detected where a content is inputtable. For example, if a right side of an input box 801 including an empty space in the form image is inclined obliquely, an area corresponding to a coordinate of the second group is larger than an area corresponding to a coordinate of the first group so that the area corresponding to the coordinate of the second group is detected as an area where a content is inputtable.

According to an exemplary method, even if a manuscript is not correctly loaded, e.g., not straight and a scanned form image or a received image is not aligned with a pixel, a single area where a content of a maximum size is inputted into an input box displayed in the form image may be detected.

FIG. 9 is a view illustrating an exemplary detected input space and a form image provided from the user interface.

Referring to FIG. 9, to visually provide a detected input space to a user, a space where a content is inputtable detected from a form image may be indicated on the form image 300 with quadrangular boxes 901, 902 and 903.

As illustrated in FIG. 9, not all areas where a content is inputtable detected from the form image 300 may be of equal importance, e.g., meaningful. A part of detected input areas may be detected from a blank of an item 902 corresponding to a content or an outside margin 901 regardless of an input box of an item. An exemplary command to exclude these unnecessary areas is explained below referring to FIG. 10.

FIG. 10 is a view illustrating an input space selected among input spaces in FIG. 9.

Referring to FIG. 10, among all detected input areas displayed in FIG. 9, a detected input area that is an input box regarding a process period 903, a detected input area that is an input box regarding personal data of an inventor, a detected input area that is an input box regarding a kind of an invention, a detected input area that is an input box regarding a title of an invention, a detected input area that is an input box regarding a date, a detected input area that is an input box regarding a declarant, and a detected input area that is an input box regarding a commission charge are retained. A user may select an input area , for example, only among all areas where a content is inputtable that are detected and displayed. Selecting may be performed by selecting an effective input area only among a displayed input area and removing the remaining area or removing an input area that is not effective. A remaining area where a user does not select may be controlled not to be displayed on a form image and information of an input space where a user does not select such as a coordinate of the input space {(x, y), (x+x', y+y')} may be deleted. As illustrated in FIG. 10, only a selected input space may be displayed as a quadrangular box on a form image.

FIG. 11 is a view illustrating an exemplary content inputted into an input space that is combined with a form image.

Referring to FIG. 11, if the form image 300 in FIG. 10 is detected and a user finishes inputting a content into a selected input space 903, an image that combines the form image 900 with the input space 903 may be generated. An inputted content 1101 may be displayed along with the form image 300 in input space. Displaying the content 1101 that is combined with the form image 300 may be performed by providing a preview function displaying a final image that is going to be printed currently.

FIG. 12 is a flowchart illustrating an image forming apparatus according to an exemplary embodiment.

Referring to FIG. 12, a form image is received (S1210). A received form image may be a scanned image, a form image inputted through a communication interface or a form image stored previously. If a file format of a received form image is compressed or expressed as a vector method, a decompression may be performed or a method may be converted to a raster method.

An area where a content is inputtable may be detected from a received form image (S1220). Detecting an area where a content is inputtable may be performed by dividing the form image in a unit of a predetermined-size block and, determining whether each of blocks is an empty space. A pre-determined size block may be a block with a half-weight and a half-height of the smallest content among a content inputtable at the user interface. A widest single area with a side vertical or horizontal to an arrangement of a pixel in an empty space of a received image may be detected as an area where a content is inputtable. A location and a size of an area where a content is inputtable may be indicated using two 2-dimensional coordinates.

Displaying a detected area where a content is inputted on a form image and selecting at least one area to input a content among displayed areas may be performed.

A content may be inputted to a detected area (S1230).

A detected area where a content is inputted may be made to correspond to an input content in a corresponding area (S1240).

Information of two 2-dimensional coordinates indicating a location and a size of a detected input space and a content inputted into a corresponding area may be matched.

A content inputted into an input space may be outputted S1250. A content may be outputted by locating and overlapping a content inputted from information of two 2-dimensional coordinates indicating a location and a size of an input space on a form image. Outputting may be done by printing a content on a form document where a input box is not recited, and by printing a content that is combined with a form image on an empty paper.

The image forming apparatus according to an exemplary embodiment does not require an additional form document solution program, a software or a server apparatus, and provides a function of automatically detecting an area where a content is inputtable from a form image using only the form image, and inputting and printing in type, so that it is possible to fill in and print a form document easily.

FIG. 13 is a flowchart explaining an exemplary method of detecting an empty space and determining a coordinate.

Referring to FIG. 13, a size of a block that becomes a unit to detect an empty space is determined (S1305). A size of a block may be predetermined, and a predetermined-size block may be a block with a half-weight and a half-height of a smallest content among a content where a user designates or inputs.

An empty space of a form image may be defined as securing a space of a specific area where a content is inputtable into not only an area where a pixel value of an image does not exit but also an entire form image.

A form image may be divided in a unit of a predetermined-size block (S1310).

A block may be selected from a divided form image (S1315). A selection of a block is performed from an end of an uppermost left side to a right side, and a line may be changed at the end of the right side. A block that is selected to detect an empty space may be distinguished from a block that is not selected, and a block included in an area of an empty space which will be explained below may not be selected as a block to detect an empty space.

An image type of a form image may be confirmed (S1320). A determination whether a selected block includes an empty space where a content is inputtable may be different according to a type of a form image.

If a type of a form image is a mono type (S1320: Mono), an empty block of a mono type is confirmed (S1320). A pixel value of a mono type image is a binary value of 0 or 1, and thus, an empty block of a mono type is confirmed by determining that a content cannot be inputted into an area where a value of at least one pixel in a block is 1.

If a form image is a gray type (S1320: Gray), an empty block of a gray type is confirmed (S1330). A pixel value of a gray type is an 8 bit value of 0 to 225, and thus, an empty block of a gray type is confirmed by determining that a content cannot be inputted into an area where a pixel value of at least one pixel in a block is not less than a threshold value.

If a form image is an RGB type (S1320: RGB), an empty block of an RGB type is confirmed (S1335). A pixel value of an RGB type is an 8 bit value of 0 to 225 with respect to R, G, B, respectively, and thus, an empty block of an RGB type is confirmed by determining that a content cannot be inputted into an area where a value of R, G, or B of at least one pixel in a block is not less than a threshold value.

A threshold value that is a standard to determine whether it is an empty space comparing to a pixel value may be pre-analyzed. Considering a case of a general form document, a threshold value may be a pixel value of a largest proportion of an entire form image, an average of pixel values of an entire form document, or an average value of pixel values in a block. An average value of arbitrary pixels among pixels in a block that is selected as a sample may be a threshold value so that a process speed may be increased.

A block that is confirmed according to each of image types may be determined whether it is an empty block (S1340).

If it is determined as an empty block (S1340: Y), an area where a content is inputtable is detected and two 2-dimensional coordinates are determined (S1345). A determination of a maximum size using a coordinate of an area where a content is inputtable is explained below.

If it is not determined as an empty block (S1340: N), or if a coordinate of an area where a content is inputtable is determined (S1345), it is determined whether a block that is not selected exits (S1350).

If a block that is not selected exists (S1350: Y), a corresponding block (S1315) is selected and an operation of determining a coordinate proceeds.

If a block that is not selected does not exist (S1350: Y), an operation of detecting an empty space from a form image is finished.

A method of detecting an empty space according to an exemplary embodiment includes dividing an image in a unit of a block that is determined as an optimum size and quickly determining whether each of image types is an empty block.

An image forming apparatus may be realized as at least one executive program for executing an image forming apparatus. The executive program may be stored in a non-transitory computer-readable recording medium.

Accordingly, each of the blocks may be executed as a code that is recordable on a non-tranisitory computer-readable recording medium. A computer-readable recording medium may be a device that is able to store a data that is readable by a computer system.

Exemplary embodiments of the present invention are illustrated and explained above, but the present invention is not limited to the described exemplary embodiments. The description of the embodiments of the present invention is intended to be illustrative, and not to limit the scope of the claims, and it would be appreciated by those skilled in the art that changes may be made to the embodiments without departing from the principles and spirit of the invention.

What is claimed is:

1. An image forming apparatus, comprising:
   an inputter to receive a form image;
   a user interface to receive a command to input a content;
   a controller to detect at least one area where a content is inputtable from the form image and, in response to the content being inputted into the detected area through the user interface,
   to make the inputted content correspond to the detected area; and
   an outputter to print the content inputted into the detected area on an area corresponding to the inputted content,
   wherein the controller detects a widest single area having a side vertical or horizontal to an arrangement of a pixel in an empty space of the received form image as an area where a content is inputtable.

2. The image forming apparatus as claimed in claim 1, wherein the outputter combines and prints the content corresponding to the detected area on the form image.

3. The image forming apparatus as claimed in claim 1, further comprising:
a scanner to scan a manuscript and generate a scan image, wherein the inputter receives a scan image generated from the scanner.

4. The image forming apparatus as claimed in claim 1, wherein the controller outputs information regarding a location and a size of an area where the detected content is inputtable using two 2-dimensional coordinates.

5. The image forming apparatus as claimed in claim 1, wherein the controller divides the received image into a unit of a predetermined-size block and detects at least one area where a content is inputtable.

6. The image forming apparatus as claimed in claim 5, wherein the predetermined-size block is in a half-width and in a half-height of a smallest content among contents that are inputtable at the user interface.

7. The image forming apparatus as claimed in claim 5, wherein in response to the received image being a mono type, the controller excludes the whole block including any pixel of having a value of 1 from an area where a content is inputtable, and in response to the image being a gray type or an RGB type, excludes the whole block including any pixel of which value is not less than a pre-analyzed threshold value from an area where a content is inputtable if any pixel value of any one of pixels in the block is not less than a pre-analyzed threshold value.

8. The image forming apparatus as claimed in claim 1, wherein the user interface displays an area where the detected content is inputtable on the form image and receives a command to select at least one area for inputting a content among the displayed area.

9. An image forming method for overwriting a form image, the method comprising:
receiving a form image;
detecting at least one area where a content is inputtable from the received image;
inputting a content into the detected area;
making the inputted content correspond to the detected area; and
printing the content inputted into the detected area on an area corresponding to the inputted content,
wherein the detecting comprises detecting a widest single area having a side vertical or horizontal to an arrangement of a pixel in an empty space of the received image as an area where a content is inputtable.

10. The method as claimed in claim 9, wherein the outputting comprises combining and printing the received image with a corresponding content on a location of an input space where the content is inputted.

11. The method as claimed in claim 9, wherein the receiving comprises scanning a form manuscript and receiving a generated form image.

12. The method as claimed in claim 9, wherein the detecting comprises expressing information regarding a location and a size of the detected input space using two 2-dimensional coordinates.

13. The method as claimed in claim 9, wherein the detecting comprises dividing the received image into a unit of a predetermined-size block and detecting at least one area where a content is inputtable.

14. The method as claimed in claim 13, wherein the predetermined-size block is in a half-width and in a half-height of a smallest content among contents that are inputtable at the user interface.

15. The method as claimed in claim 13, wherein the detecting comprises in response to the received image being a mono type, determining that the whole block including any pixel of which value is 1, is not a space where a content is inputted if a pixel value of any one of pixels in the block is 1, and in response to the image being a gray type or an RGB type, determining that the whole block including any pixel of which value is not less than a pre-analyzed threshold value is not a space where a content is inputted if a pixel value of any one of pixels in the block is not less than a pre-analyzed threshold value.

16. The method as claimed in claim 9, wherein the image forming method further comprising:
displaying an area where the detected content is inputtable on the form image; and
selecting at least one area for inputting a content among the displayed area.

17. An image forming method for overwriting, the method comprising:
receiving an image;
detecting at least one area where a content is inputtable from the received image;
inputting a content into the detected area;
making the inputted content correspond to the detected area; and
printing the content inputted into the detected area on an area corresponding to the inputted content,
wherein the detecting comprises detecting a widest single area having a side vertical or horizontal to an arrangement of a pixel in an empty space of the received image as an area where a content is inputtable.

* * * * *